May 14, 1963 A. WURM-REITHMAYER 3,089,290
GRINDING DEVICES
Filed Dec. 9, 1959 3 Sheets-Sheet 1
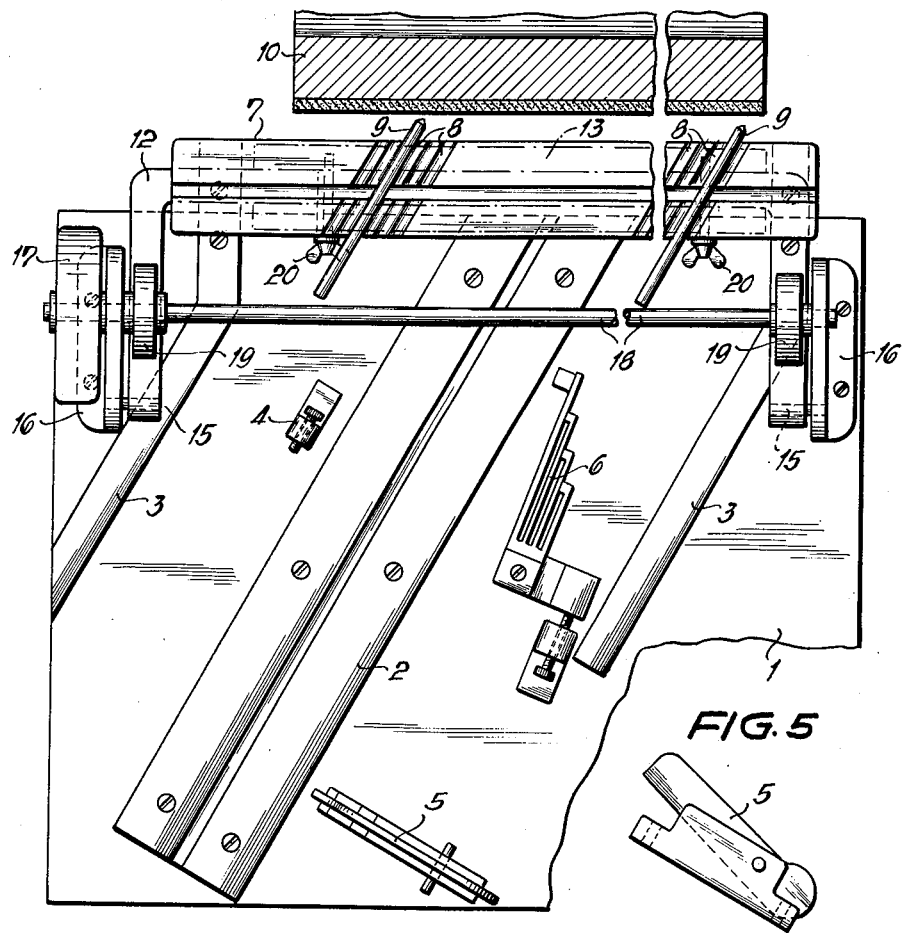
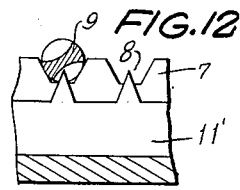
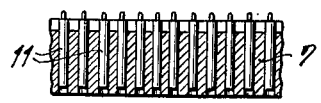
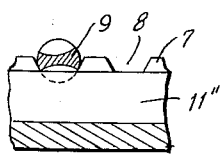
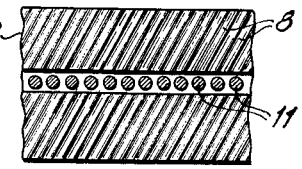

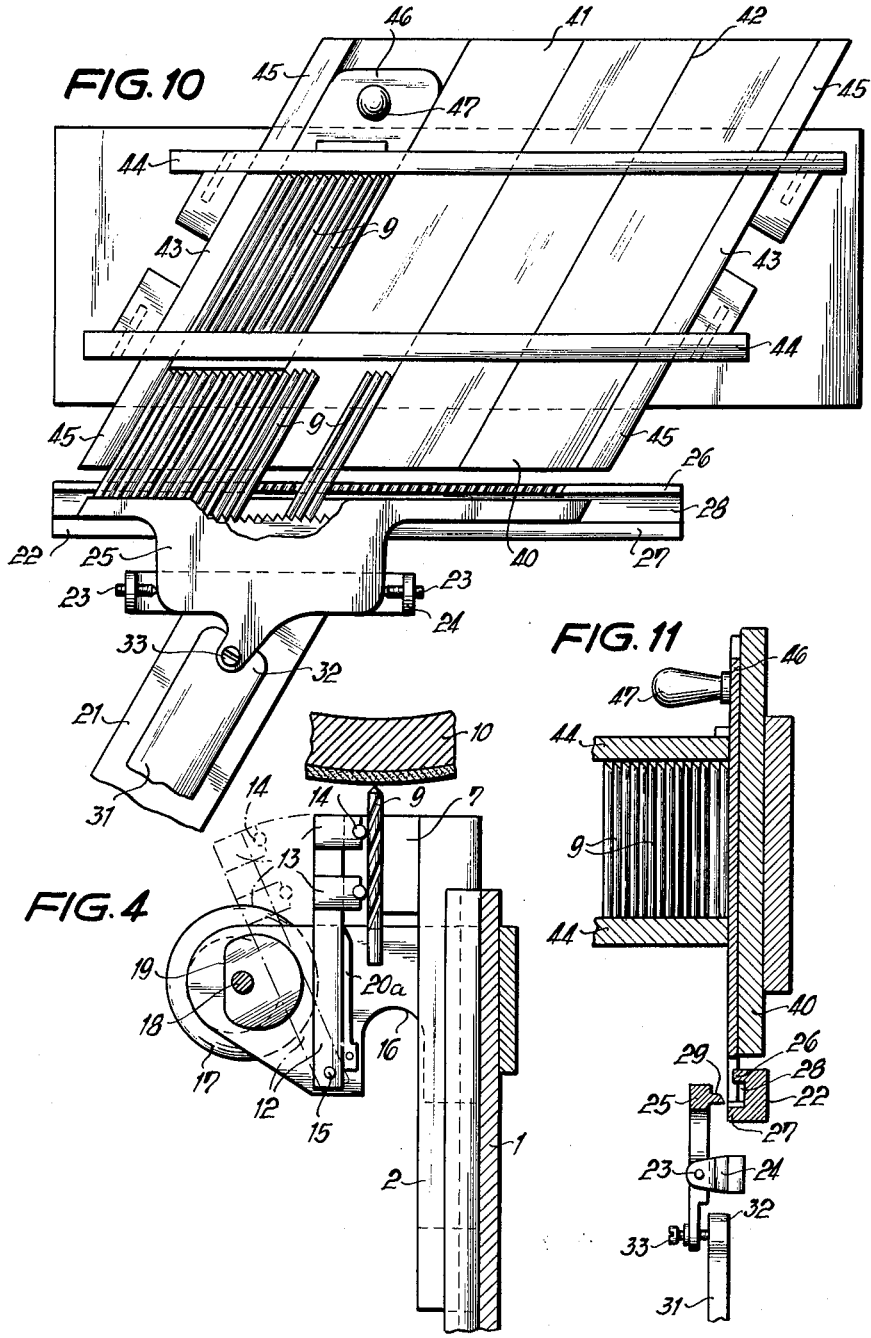

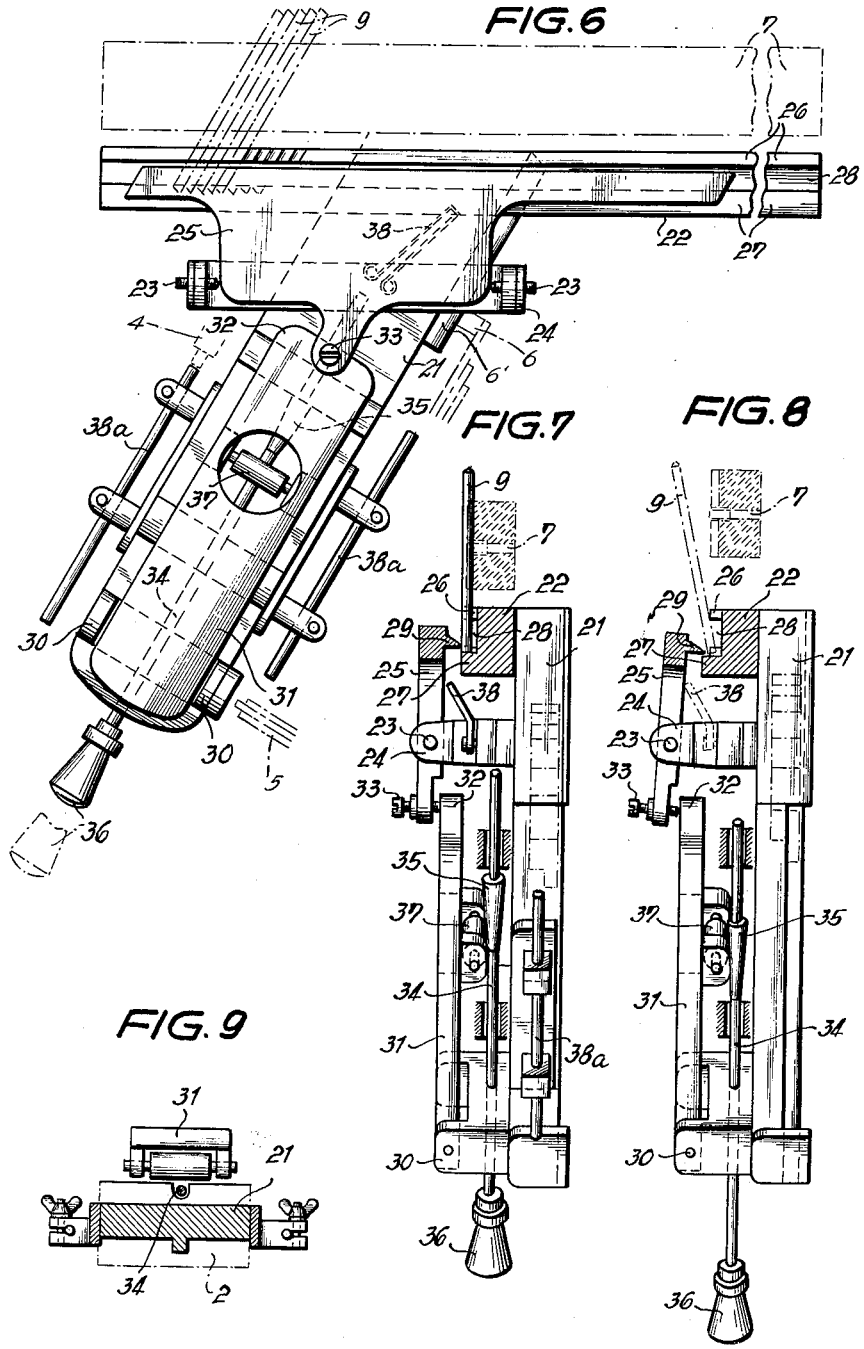

United States Patent Office 3,089,290
Patented May 14, 1963

3,089,290
GRINDING DEVICES
August Wurm-Reithmayer, 38 Eppsteinerstrasse,
Frankfurt am Main, Germany
Filed Dec. 9, 1959, Ser. No. 858,492
8 Claims. (Cl. 51—98)

The invention relates to apparatus for grinding the cutting edges of drills having a cylindrical shank.

In the factories which produce drills, it has hitherto been the custom to grind the drill bits individually. The number of drills which can be ground per hour is comparatively small. One worker produces a maximum of 400 drills per hour. This number takes into consideration the fact that auxiliary devices are used to grip the drill, to guide it against the grinding wheel etc.

It has been found that this work is considerably facilitated, considerably greater accuracy is obtained and the number of drills which can be ground per hour can be considerably increased, if, in accordance with the invention, a clamping ledge is used having slots arranged side by side, the inclination of which, in relation to the longitudinal extent of the clamping ledge, corresponds to the cutting angle of the drill, together with a grinding device which covers the width of all the slots.

The alignment of the drill bits to be ground can very easily be effected, in a further development of the invention, by means of a guide device which engages in spiral flutes in the drills. In particular, the guide device may engage in that spiral flute which is associated with the cutting edge to be ground. This ensures that the cutting edge is located precisely at that point which is predetermined by the spiral flute. In particular, distortion of the cutting edge in question, which was hitherto inevitable if, as a result of inaccurate indexing in the production of the flutes, these were not at exactly 160° in relation to one another, is prevented.

In order that both cutting edges of a drill may be ground without much trouble on the same clamping ledge, it is advisable to provide means for displacing the drill and the guide device relatively to one another through such a distance that the drill is turned through 180°. After such a turning, all the drills are again accurately aligned so that the second cutting edge can then be ground.

In one embodiment of the invention, the guide device consists of guide members or catches, for example pins, which are inserted fixed in the slots in the clamping ledge and a mechanism is provided which brings the drills out of engagement with the guide device and permits such longitudinal displacement of the drills that the other spiral flute of the drills is engaged by the guide device. In this case, the pins of the guide device may also be replaced by the teeth of a toothed band introduced into the clamping ledge. The last-mentioned construction ensures that no inaccuracies occur in the spacing of the individual guide members. It is often sufficient to provide a band or rod without teeth. During the forward movement, the drill comes to rest on the two edges of the slot and is then subjected to rotary movement.

In another embodiment, the guide device consists of resiliently held guide members which are secured in a holding means which is displaceable relative to the clamping ledge by such an amount that the drills are turned through 180°. A particularly simple construction of these guide members consists of a rake, the tines of which are bent forward by 90°.

During the grinding, the drills can be held in the slots in the clamping ledge by means of a clamp which may be constructed and actuated in any desired manner.

Work with the new device is considerably facilitated if a gripping device is used having a vice which corresponds to the slots in the clamping ledge and in which the drills can be transferred to the clamping ledge from a ramp which is adapted to the slots in the clamping ledge. In this case, the drills do not have to be arranged individually on the clamping ledge after each grinding operation and instead the gripper supplies the full number of them, between about 15 and 100 depending on the size, to the clamping ledge.

A particularly satisfactory solution provides for the gripping device to serve simultaneously as the device which brings the drills out of engagement with the guide device and permits a longitudinal displacement of the drills relative to the guide device.

The mode of operation of the device is further accelerated if a magazine for supplying the drills is associated with the ramp. This magazine may be provided, at the lower edge, with an outlet for the drills, the adjustable height of which, above the ramp, is such that on a relative movement between the ramp and the magazine one drill after another slides into the slots provided therefor in the ramp. In another embodiment, a specific number of drills at a time is slid side-by-side into the slots in the ramp.

With the new device it is possible for one operator, on the average, to achieve at least eight times as much as one worker could previously achieve.

Further features, advantages and possible applications of the invention are clear from the following description with reference to the drawing.

FIG. 1 shows a plan view of the device according to the invention with the gripping device removed;
FIG. 2 shows a section through the clamping ledge;
FIG. 3 shows a plan view of the clamping ledge;
FIG. 4 shows a section through the device of FIG. 1, seen from the side;
FIG. 5 shows the right-hand stop in side elevation;
FIG. 6 shows the gripping device in plan;
FIG. 7 shows the gripping device in side elevation, partially in section, the drills being released by the vice;
FIG. 8 shows the gripping device in a view similar to FIG. 7, with the vice gripping the drill;
FIG. 9 shows the gripping device in cross-section;
FIG. 10 shows an example of an arrangement of magazines, ramps and gripping device in plan view;
FIG. 11 shows the arrangement of FIG. 10 in cross-section;
FIG. 12 is a partial section of a detail of FIG. 1; and
FIG. 13 is a partial section of another detail of FIG. 1.

The base plate with the clamping ledge will now be explained with reference to FIGS. 1 to 5. Mounted on the base plate 1 are a center guide rail 2 and two lateral guide rails 3. These rails serve to guide the gripping device, which will be described below, on the base plate. A first adjustable stop 4 and a second stop 5 having a pawl, limit the distance of the reciprocating movement of the gripping device. An adjustable brake spring 6, which co-operates with a slide rail 6' on the gripping device shown in FIG. 6, serves to subject the gripping device to such a frictional pressure that the movement is only possible after overcoming a certain force.

The clamping ledge 7 is provided with a plurality of slots 8 which run obliquely. These slots may, for example, be prismatic in shape. The slots are at an angle to the longitudinal extent of the ledge 7 which is equal to the cutting angle of the drill 9 to be ground, for example 58″. If, in addition, provision is made to ensure that all the cutting edges to be ground run horizontally, all the drills 9 can be machined at once by means of a grinding device 10 which covers the width of all the slots.

In the embodiment shown here, the accurate alignment of the cutting edges of the drills 9 to be ground is effected by guide members, or catches 11 which engage in the flutes in the drills and have such a position that each drill engaged by them stands, in the end position, with the cutting edge which is to be ground horizontal. The guide members are here constructed in the form of pins which engage through the guide ledge 7 from below and end at the tops in points.

The individual drills are held in the slots of the clamping ledge 7 by means of a clamp 12 during the grinding. At its front end, this clamp carries a pressure bar 13, which is adjustable in height and presses against the drill by means of a resilient insert 14, for example of rubber. The clamp pivots about a pin 15 which rests in bearing brackets 16. See FIG. 4. A spindle 18 which is provided with a handle 17 and which is likewise mounted in the bearing brackets 16, carries cam plates 19 which press the clamp down on rotation of the shaft 18. Adjustment between the clamp 12 and the pressure bar 13 is afforded by winged screws 20 which are guided in slots in one of the two parts. Lifting of the clamp against the force of the cam plate 19 is caused by means of a spring 20a.

FIGS. 6 to 9 illustrate the construction of the gripping device. This device, with its base member 21 is displaceable along the guides 2 and 3 on the base plate 1. At the front end is the so-called vice which consists of a lower part 22 rigidly connected to the base member and an upper part 25 which is pivotable about the pins 23 in the bracket 24. The lower part comprises a front bar 26 with slots similar to those in the clamping ledge 7 and a rear stop bar 27 with oblique stops corresponding to the inclination of the slots. In between is a free space 28. The upper part of the vice comprises a projection 29. When this projection presses against the drills (FIG. 8), the front of these is lifted and they come out of engagement with the guide device in the slots 8 of the clamping ledge 7. The drills are held in this position and may be transported by the gripping device. Mounted at its rear end on a bracket 30 is a single-armed lever 31. This acts with its front end 32 on a set-screw 33 on the movable upper part 25 of the vice.

The upward and downward movement of the single-armed lever 31 is effected by means of a draw rod 34 which carries a tapered member 35 and is also provided with a handle 36. The tapered member acts on a roller 37 on the single-armed lever 31 so that, when the rod 34 is pulled out, the end 32 of the lever is lifted and so the vice is closed. A spring 38 ensures that the movable upper part of the vice returns to the open position when unloaded.

On the outside of the base member 21 are two stop rods 38a which can come into engagement with the corresponding stops 4 and 5 on the base plate. These stop rods are adjustable in the longitudinal direction. FIG. 9 also shows that the base member can be provided with a tongue 39 which can engage in a corresponding groove in the guide rail 2 on the base plate 1.

The gripping device may also serve, at the same time, to pick up a predetermined number of drills from a ramp 40 and then immediately supply them to the clamping ledge.

FIGS. 10 and 11 show a device by means of which such a ramp can quickly be charged from a magazine. The magazine comprises a base plate 41 which is provided with individual guide rails 42. The area filled with drills is determined by the side walls 43 and the longitudinal walls 44. The side walls 43 are continued to the front and rear in the form of guide bars 45. A thrust plate 46 with a handle 47 is placed in the space between each pair of guide rails 42 or lateral rails 43 and displaced forwards. Each time, a set of drills is pushed forwards into the appropriate position on the ramp 40. In this manner, the ramp can be filled very quickly with drills in the prearranged form. The ramp preferably has similar slots to those in the clamping ledge 7.

In operation, the drill magazine is first filled with a plurality of drills of the same dimensions. By advancing the thrust plate 46 between the guide rails 42 or the lateral rails 43, the ramp 40 is filled with drills 9 in a prearranged position. Then the gripper device is pushed up in such a manner that the individual drills engage with the end which is not to be ground in the oblique recesses 27 in the stop bar and in addition come to lie in the slots in the front band 26 of the lower part 22 of the vice. Then the push rod 34 is withdrawn backwards by means of the handle 36 in the course of which the roller 37 rolls on the tapered member 35 on the push rod. As a result, the longitudinal motion of the push rod is converted into a lifting movement of the front end 32 of the single-armed lever 31. The front end 32 acts through the screw 33 on the movable upper part 25 of the vice, as a result of which the individual drills are held at the rear and are pressed down so far that they come out of engagement with the ramp 40 at the front.

The gripper device thus charged is pushed on the guides 2 and 3 of the base plate 1 until the stop rod 38a on the right-hand side engages behind the pawl 5. In this position, the drills 9 are already over the associated slots 8 in the clamping ledge 7. If the handle 36 is now pushed in, the vice opens and the drills come to lie at random at first and without their cutting edges aligned, in the associated slots 8. Then the gripping device is advanced until the stop rod 38a on the left-hand side abuts against the stop 4. During this forward movement, the guide members 11 necessarily engage, either right at the beginning or in the course of the movement, in the spiral grooves in the drills to be ground. At the end of the forward movement, therefore, all the drills have the same position as regards their cutting edges. There is no difficulty in measuring the forward movement of the drills, for example by adjustment of the left-hand stop rod 38a in such a manner that all the cutting edges to be ground lie horizontally.

Then all the drills can be locked on the clamping ledge 7 by the clamp 12, through the cam plate 19 being turned by means of the handle 17. Now, with a single movement of the whole clamping device past the grinding device 10 (or vice versa), all the first cutting edges of the drills can now be ground.

Then the clamp 12 is raised and the vice closed by pulling out the knob 36. In the course of this, the front ends of the drills 9 are raised (FIG. 8) and come out of engagement with the guide members 11. Then the gripping device is pulled back until the rod 31 abuts against the stop 5. This distance is so dimensioned that it corresponds to the axial distance between the two opposite spiral grooves or an odd multiple thereof. If the vice is now opened again, all the drills again come to lie in the associated slots 8 but this time the guide members engage in this spiral flute which did not serve as a guide the first machining. If the gripping device is now pushed forwards, the individual drills are automatically turned through 180° so that now all the second cutting edges are in a horizontal line. The clamp 13 can then be pressed down again and the clamping device conveyed past the grinding device.

The cutting edges of the drills are now finish-ground. By opening the clamp, closing the vice and withdrawing the whole gripping device, all the drills can then be removed together.

The operation of the whole gripping device is facilitated by the brake spring 6 and the associated brake slide rail 6' (FIG. 6). The brake pressure is set so that it is somewhat greater than the force which is necessary to push in or pull out the handle 36. In this manner, all the movements can be controlled in the most simple manner simply by operating the gripping device at the handle 36. When, during the advance, the gripping device reaches the brake spring 6, the push rod 34 is pushed in, as a result of which the vice opens and the drills are deposited in the slots 8. On further displacement of the handle 36, the whole gripping device moves forwards and now pushes the drills, which are no longer held by the vice, into their grinding position. On withdrawal of the handle, the vice is first closed, that is to say the drills are brought out of engagement with the guide members. Only on further withdrawal of the handle 36 does the gripping device, with the drills now gripped, move back as far as the stop 5. On renewed advance, the gripper is first opened again before the gripping device is pushed further forwards so that here, too, the drills are first released and then pushed forwards.

In order to be able to arrange the drills as closely together as possible, it is advisable to make the clamping ledge, the ramp and the stationary lower part of the vice interchangeable and to maintain stocks of the various slots sizes, although the prismatic shape of the slots and the other possible adjustments are sufficient for grinding sets of drills of different diameters in successive operations with one clamping ledge and form of ramp. It is also advisable to make the base plate 41 of the magazine interchangeable in order that this may be adapted to the various requirements.

The invention is not limited to the embodiment illustrated by way of example. A number of modifications are conceivable without departing from the basic idea of the invention. For example, as a substitute for the pointed pins 11 arranged side by side in the clamping ledge 7, a toothed rack 11' (FIG. 12) may be inserted in the clamping edge 7, which ensures a precise spacing of the individual teeth and which may also have such a tooth shape as corresponds to the cross-sectional shape of the spiral groove. Even a smooth bar 11'' (FIG. 13) may be inserted in the clamping edge 7, with its upper edge as a guide member for the spiral groove. The bars may also be replaced by rods of any desired cross-section (circular, square etc.). Nor is it always necessary for the drills to be moved relative to their guide members. Instead, the guide members may be moved relative to the drills. For example, it is possible to provide, above the clamping ledge, a part which is displaceable relative thereto and which contains the guide members. These guide members are then preferably resiliently mounted. When these resilient members engage in the flutes of the drills and are then pushed back a distance which corresponds to the spacing between two successive flutes, the drill is likewise turned through 180°.

Instead of the magazine illustrated, another arrangement may also be used, which is constructed, for example, in such a manner that its lower edge with the outlet for drills is arranged at such an adjustable height above the ramp that, on a relative movement between the ramp and the magazine, one drill after the other slides into the slots provided therefor in the ramp. The work can be accelerated if a plurality of ramps, or better still, a plurality of gripping devices are used, each of which is filled when another gripping device is cooperating with the clamping device.

I claim:

1. In apparatus for grinding the cutting edges of helical drills having cylindrical shanks: a clamping ledge having parallel slots therein arranged side by side for receiving the drills to be ground, a pressure bar for clamping the respective drills in the slots, the slots in said clamping ledge having an angular position relatively to the longitudinal extent of said clamping ledge corresponding to the cutting angle of the drill, one catch coordinated to each slot engaging the flutes in the drills to set their proper cutting angles, means for turning all drills simultaneously around their respective axes through 180° which turning means comprises a common means for sliding the drills and said catches relative to each other in the direction of the axes of the drills, a grinding device extending over the entire width of all slots in said clamping edge, means for moving said clamping ledge and said grinding device into grinding relationship with one another and opening and closing means engaging the drills to close the catches upon the flutes in the drills while said sliding means slides the drills and said catches relative to each other in one direction and thereafter to separate the catches from said flutes while said sliding means returns to its starting position, at which position the catches are closed upon the flutes adjacent to the firs mentioned flutes, whereby the catches always grip the proper flute coordinated to the cutting edges to be ground.

2. In an apparatus for grinding the cutting edges of helical drills having cylindrical shanks: a clamping ledge having parallel slots therein arranged side by side for receiving the drills to be ground, a pressure bar for clamping the respective drills in the slots, the slots in said clamping ledge having an angular position relatively to the longitudinal extent of said clamping ledge corresponding to the cutting angle of the drills, one catch coordinated to each slot engaging the flutes in the drills to set their proper cutting angles, means for turning all drills simultaneously around their respective axes through 180° which turning means comprises a common means for sliding the drills and said catches relative to each other in the direction of the axes of the drills, a grinding device extending over the entire width of all slots in said clamping ledge, means for moving said clamping ledge and said grinding device into grinding relationship with one another, opening and closing means engaging the drills to separate the catches from the flutes in the drills while said sliding means slides the drills and said catches relative to each other in one direction and thereafter to close the catches upon the flutes adjacent to said first-mentioned flutes of the drills, while said sliding means returns to its starting position, whereby the catches always grip the proper flute coordinated to the cutting edges to be ground.

3. In apparatus for grinding the cutting edges of helical drills having cylindrical shanks: a clamping ledge having parallel slots therein arranged side by side for receiving the drills to be ground, the inclination of the slots in relation to the longitudinal extent of said clamping ledge corresponding to the cutting angle of the drill, a pressure bar for clamping the drills in place upon said clamping ledge, one catch fixed in each slot engaging the flutes in the drills to set their proper cutting angles, means for turning all drills simultaneously around their respective axes through 180°, which turning means comprises a common means for sliding the drills and said catches relative to each other in the direction of the axes of the drills, a grinding device extending over the entire width of all of the slots in said clamping ledge, opening and closing means engaging the drills to separate the catches from the flutes in the drills while said sliding means slides the drills and said catches relative to each other in one direction and thereafter to close the catches upon the flutes of the drills, while said sliding means returns to its starting position, the sliding, opening and closing means being combined in the form of gripping tongs covering the entire width of said clamping ledge, said tongs having a front bar thereof with slots therein corresponding to those of the clamping ledge, a rear bar to set the drill ends which require no grinding, and a third bar pressible down into the space between the front and rear bars to bear against the drill ends which require no grinding to lift the opposite ends of the drills.

4. In apparatus according to claim 3, wherein said catches comprise teeth formed on a toothed rack inserted in the clamping ledge.

5. In apparatus according to claim 3, wherein said catches comprise the upper edge of a smooth bar inserted in the clamping ledge.

6. In apparatus for grinding the cutting edges of helical drills having cylindrical shanks: a clamping ledge having parallel slots therein arranged side by side for receiving the drills to be ground, the inclination of the slots in relation to the longitudinal extent of said clamping ledge corresponding to the cutting angle of the drills, a pressure bar for clamping the respective drills in the slots of said clamping ledge, one catch fixed in each slot engaging the flutes in the drills to set their proper cutting angles, means for turning all the drills simultaneously around their respective axes through 180° which turning means comprises a common means for sliding the drills and said catches relative to each other in the direction of the axes of the drills, and a grinding device extending over the entire width of all slots in said clamping ledge, opening and closing means engaging the drills to separate the catches from the flutes in the drills while said sliding means slides the drills and said catches relative to each other in one direction and thereafter to close the catches upon the flutes of the drills while said sliding means returns to its starting position, the sliding, opening and closing means being combined in the form of gripping tongs covering the entire width of said clamping ledge said tongs having a front bar with slots therein corresponding to those of said clamping ledge, a rear bar to set the drill ends and a third bar pressible down into the free space between the front bar and the rear bar to lift the drills at their ends, a guide rail on which the gripping tongs are mounted, and a drill supply ramp with slots corresponding to the slots in said clamping ledge, whereby said gripping tongs can pick up the drills in the slots in said ramp and transfer them to position on said clamping ledge.

7. In apparatus according to claim 6, a magazine for the drills operatively associated with said drill supply ramp for feeding drills to said ramp, said magazine having at its bottom a discharge for drills higher than said ramp by a distance at least as high as the diameter of a drill.

8. In apparatus according to claim 6, a magazine positioned in front of said ramp movable with respect thereto, said magazine having therein a passage adapted to discharge simultaneously a plurality of drills positioned side by side upon said ramp, the passage in said magazine being positioned substantially at the level of the slots in said ramp.

References Cited in the file of this patent

UNITED STATES PATENTS

| 2,367,494 | Gebel | Jan. 16, 1945 |
| 2,424,470 | Kronwall | July 22, 1947 |
| 2,614,370 | Kapnick | Oct. 21, 1952 |

FOREIGN PATENTS

| 582,234 | France | Dec. 15, 1924 |
| 623,734 | Great Britain | May 23, 1949 |